United States Patent
Anter

(10) Patent No.: US 10,432,780 B2
(45) Date of Patent: Oct. 1, 2019

(54) AUTOMATIC VEHICLE OPERATOR DETECTION FOR IN-VEHICLE RISK-FREE MOBILE DEVICE USE

(71) Applicant: Nuri G. Anter, Flemington, NJ (US)

(72) Inventor: Nuri G. Anter, Flemington, NJ (US)

(*) Notice: Subject to any disclaimer, the term of this patent is extended or adjusted under 35 U.S.C. 154(b) by 0 days.

(21) Appl. No.: 15/887,314

(22) Filed: Feb. 2, 2018

(65) Prior Publication Data
US 2019/0245965 A1 Aug. 8, 2019

(51) Int. Cl.
H04M 1/725 (2006.01)
H04W 4/02 (2018.01)
H04W 84/04 (2009.01)
H04W 4/40 (2018.01)
H04W 4/14 (2009.01)

(52) U.S. Cl.
CPC ....... *H04M 1/72577* (2013.01); *H04W 4/027* (2013.01); *H04W 4/14* (2013.01); *H04W 4/40* (2018.02); *H04W 84/042* (2013.01)

(58) Field of Classification Search
CPC ... H04M 1/72577; H04W 4/027; H04W 4/14; H04W 4/40; H04W 84/042
See application file for complete search history.

(56) References Cited

U.S. PATENT DOCUMENTS 9,154,923 B2* 10/2015 Bai .................... H04L 67/12
9,386,142 B2* 7/2016 Craine ............... H04M 1/72577
9,813,897 B2* 11/2017 Manente ........... H04M 1/72577
2011/0065375 A1* 3/2011 Bradley ............ H04M 1/72577 455/1
2012/0040665 A1* 2/2012 Liu ..................... H04W 4/80 455/426.1
2013/0137404 A1* 5/2013 Kuo .................... H04W 4/046 455/413
2013/0303143 A1* 11/2013 Schrader ............ H04W 12/08 455/418
2013/0331078 A1* 12/2013 Sigal .................. H04W 8/22 455/418
2014/0323111 A1* 10/2014 Ning .................. H04M 1/72577 455/418
2017/0228566 A1* 8/2017 Sengstaken, Jr. .. G06K 7/10009
2018/0072321 A1* 3/2018 Mueller .............. B60Q 9/00
2018/0103141 A1* 4/2018 Thompson ......... H04M 1/72577
2018/0115859 A1* 4/2018 Ghabra .............. H04W 8/005
2018/0146081 A1* 5/2018 Brenner ............. H04W 76/14

* cited by examiner

*Primary Examiner* — Brandon J Miller

(57) ABSTRACT

A wireless terminal having a user interface comprising: i) a cellular transceiver configured to communicate with a cellular network and to receive therefrom an incoming text message from a calling party; ii) a personal area network PAN transceiver configured to communicate with a vehicle PAN transceiver associated with a vehicle; iii) a controller configured to determine when the vehicle is moving and to place the wireless terminal in a DRIVE mode. During DRIVE mode, the controller detects receipt of the incoming text message by the cellular transceiver and is further configured to prevent the text message from being displayed to the driver on the user interface of the wireless terminal.

11 Claims, 6 Drawing Sheets

AUTOMATIC VEHICLE OPERATOR DETECTION FOR IN-VEHICLE RISK-FREE MOBILE DEVICE USE

TECHNICAL FIELD

The present application relates generally to texting applications on mobile phones and, more specifically, to a method of disabling a texting application while a mobile phone user is driving.

BACKGROUND

Distracted driving has become a national problem, particularly as it relates to mobile phone operation. A person that answers calls or reads and responds to text messages while driving a vehicle is far more likely to get into an accident. To combat this, some mobile phones are developing protection features that disable texting when the mobile phone is moving in a vehicle.

However, these protection features are of limited value because they may disable texting even if the mobile phone user is a passenger, not the driver. Additionally, these protection features simply disable texting and in some cases may send an alert message to the calling stating that the called party is unavailable because he or she is driving.

Therefore, there is a need in the art for improved methods and apparatuses for disabling texting applications while providing enhanced alternative features to the mobile phone user.

SUMMARY

To address the above-discussed deficiencies of the prior art, it is a primary object to provide a wireless terminal having a user interface, the wireless terminal comprising: i) a cellular transceiver configured to communicate with a cellular network and to receive therefrom an incoming text message from a calling party; ii) a personal area network (PAN) transceiver configured to communicate with a vehicle PAN transceiver associated with a vehicle; iii) a controller configured to determine when the vehicle is moving and to place the wireless terminal in a drive mode. During drive mode, the controller detects receipt of the incoming text message by the cellular transceiver and is further configured to prevent the text message from being displayed to the driver on the user interface of the wireless terminal.

In one embodiment, the controller is further configured to transmit a response message to the calling party, the response message stating that the driver is unable to receive text messages.

In another embodiment, the incoming text message is a short messaging service (SMS) text.

In still another embodiment, the incoming text message is processed by a message application in a memory of the wireless terminal.

In yet another embodiment, the controller is further configured to determine if the calling party that sent the incoming text message is listed in a Contacts list associated with the wireless terminal.

In a further embodiment, the controller is further configured, in response to a determination that the calling party is listed in the Contacts list, to notify the driver that a text message has been received from the calling party.

In a still further embodiment, the controller is further configured, in response to a determination that calling party is listed in the Contacts list, to display a message on a user interface of the vehicle that a text message has been received from the calling party.

It is another primary object to provide a wireless terminal comprising: i) a user interface comprising a display and a user input device; ii) a cellular transceiver configured to communicate with a cellular network; iii) a personal area network (PAN) transceiver configured to communicate with an external PAN transceiver; and iv) a controller configured to determine when an operator of the wireless terminal has disabled the PAN transceiver and, in response, to cause the PAN transceiver to cycle ON and OFF and search for the external PAN transceiver while disabled.

In one embodiment, the controller is further configured to enable the PAN transceiver for full operation when the PAN transceiver detects the external PAN transceiver.

It is still another primary object to provide a system in a vehicle for communicating with a wireless terminal associated with a driver. The system comprises: i) a vehicle personal area network (PAN) transceiver configured to communicate with a PAN transceiver associated with the wireless terminal; ii) a vehicle user interface configured to display messages and to receive manual inputs from a driver of the vehicle; and iv) a controller configured to detect the presence of the wireless terminal in the vehicle and to transmit a control message to the wireless terminal operable to place the wireless terminal in a drive mode which prevents the wireless terminal from notifying the driver on a user interface of the wireless terminal that a text message has been received.

In one embodiment, the controller detects the presence of the wireless terminal when the vehicle PAN transceiver pairs with the PAN transceiver of the wireless terminal.

In another embodiment, the controller transmits the control message to the wireless terminal when the vehicle shifts out of Park.

In still another embodiment, the controller is further configured to receive from the wireless terminal a message identifying a called party that sent the text message.

In a further embodiment, the controller is further configured to display on the vehicle user interface a message indicating that a text message has been received from the called party.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. In advantageous embodiments, a controller may be implemented as a microprocessor or microcontroller that executes operating system software or an application that is stored in an associated memory. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
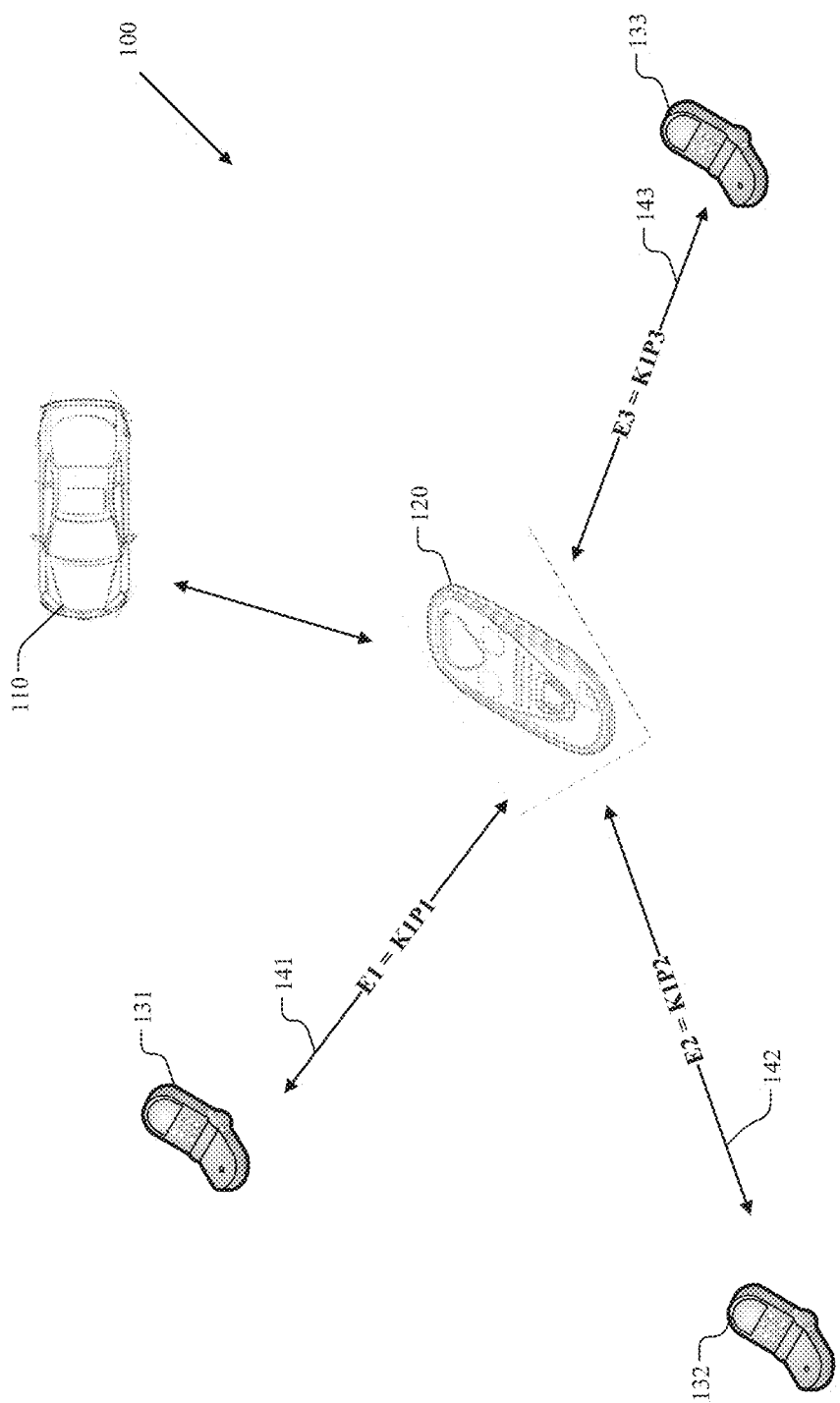
FIG. 1 illustrates a system for automatic detection of vehicle operation to provide for in-vehicle, risk-free mobile device use according to one embodiment of the disclosure.

FIGS. 1 through 6, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged mobile phone and vehicle environment.

A system according to the principles of the present disclosure provides the functionality of texting and driving, but the driver of the vehicle never actually texts and, therefore, the risk associated with texting while driving is eliminated. During operation, the disclosed system knows that the driver is driving and has his or her mobile phone. The disclosed system requires no action by the mobile phone user other than setting the phone up once when the phone is paired with the vehicle's wireless network. By automatically detecting the mobile phone, it is not necessary to turn the text blocking or disabling function on and off every time the driver/mobile phone user enters and exits the vehicle. Automatically detecting the mobile phone also enables other functions, such as enabling the driver to respond to a received text message while driving without the driver actually typing or looking at the mobile phone display.

In one embodiment of the disclosed system, the system permits the driver to receive SMS text messages only from persons listed in the contacts list associated with the mobile phone. When this occurs, the user interface (UI) of the vehicle (e.g., a dashboard display, a steering wheel display, an infotainment system screen, etc.) may display the contact name associated with the received text and the driver may choose to call that person. In one embodiment, the disclosed system may handle only SMS text messages in this manner and may handle text messages associated with other text applications (e.g., Whatsapp) in a different manner. In an alternate embodiment, the disclosed system may handle both SMS text messages and text messages from Whatsapp and similar applications in this manner.

In one embodiment, a wireless key fob may be used to introduce the mobile phone to the vehicle software control platform via a wireless interface, such as a personal area network (PAN) transceiver (e.g., Bluetooth transceiver) or a near field communication (NFC) transceiver. In this manner, a vehicle identification (ID) may be transmitted to and stored in the mobile phone and a mobile phone ID may be transmitted to and stored in the vehicle software control platform. Thereafter, the wireless transceiver of the vehicle is configured to search for the particular mobile phone, so that the mobile phone and vehicle may automatically connect without requiring any action by the driver.

In an advantageous embodiment, the Bluetooth transceiver (or other PAN transceiver) of the mobile phone is cycled on and off automatically in order to save battery life. When the driver starts the ignition of the vehicle, the vehicle wireless network is turned on and the mobile phone Bluetooth (BT) transceiver and the vehicle BT transceiver are able to detect each other and pair together. In this manner, it is not necessary for the driver to turn the BT settings of the mobile phone ON or OFF when entering or exiting the vehicle. The mobile phone simply resumes duty cycling of the BT transceiver when the car ignition is turned off.

If the sending party chooses to send an audio message, the driver may use an already existing mechanism in the vehicle to listen. For example, when the audio message is received the driver can push the PHONE button on the steering wheel or a dashboard display for five (5) seconds so that the audio message is played through a Bluetooth-connected speaker system of the vehicle. The driver may then choose to respond to the message by pushing the PHONE button three consecutive times and then holding the PHONE button down. This notifies the vehicle operating system platform that the driver wants to record an audio message in response to the received audio message. The mobile phone then records the audio message via the same app and once the driver releases the PHONE button, the response voice message is sent via the same application by the mobile phone. If more than one audio message is received, then the vehicle operating system platform may be designed to handle each message using a convenient user interface for the driver so that answering is without risk.

FIG. 1 illustrates system 100 for automatic detection of vehicle operation to provide for in-vehicle, risk-free mobile device operation according to one embodiment of the disclosure. System 100 comprises vehicle 110, key fob 120, and a plurality of mobile phones 131-133. In one embodiment, when key fob 120 is in close proximity to vehicle 110, the driver may press a button on key fob 120 to open the doors of vehicle 110 and may start the engine using a key in key fob 120. In another embodiment, vehicle 110 may include a passive entry, passive start (PEPS) system that locks and unlocks the doors of vehicle 110 when key fob 120 is in close proximity to vehicle 110 without the driver touching key fob 120. The PEPS system also allows the driver to start or to stop the engine without touching the key fob 120 simply by pushing an ignition button on the dashboard.

According to the principles of the present disclosure, key fob 120 may create secure communication links 141-143 with one or more mobile devices, such as exemplary mobile phones 131-133. In an exemplary embodiment, mobile phone 131 may belong to the owner of vehicle 110 and mobile phones 132 and 133 may belong to other members of the owner's family (i.e., permitted operators of the vehicle). Key fob 120 creates a logical entity that provides encryption for secure communication with each mobile phone 131-133. For example, key fob 120 may use a public key encryption technique that uses a key P1 associated with mobile phone 131 and a key K1 associated with key fob 120 to create logical entity E1=K1P1. Similarly, key fob 120 may use key P2 and P3 associated with mobile phones 132 and 133, respectively, to create logical entities E2=K1P2 and E3=K1P3. Logical entities E1, E2, and E3 provide the secure communication links 141-143.

The key is paired with the mobile phone via secure communication, this could be accomplished through any communications technology. In routing operation, mobile phone 131 registers the identification (ID) of mobile phone 131 with key 120. This ID includes the mobile number associated with mobile phone 131. In turn, when the driver presses the START button of vehicle 110, vehicle 110 searches for mobile phone 131 via the wireless network of vehicle 110 and mobile phone 131 automatically pairs with the vehicle 110 wireless network without any user interaction According to the principles of the present disclosure, a method is implemented so that only in the appropriate vehicle 110 will mobile phone 131 and the phone pair automatically. Thus, when mobile 131 is registered to key fob 120, key fob 120 may be registered to vehicle 110. This would enable mobile phone 131 not to have a personal area network (PAN), such as a Bluetooth transceiver, turned ON all the time. Advantageously, if mobile phone 131 is not in vehicle 131 when the START button is pressed, vehicle 131 may indicate to the driver that the driver does not have mobile phone 131 with him or her.

As noted, wireless key fob 120 associates with mobile phone 131 through secure communication link 141 maintained by logical entity E1=K1P1. This may be performed by any wireless technology and/or optical technology. Once associated, the same may occur for another driver of vehicle 110 with another mobile device, such as mobile phones 132 and 133. If there is more than one key fob 120, the same process may be applied to each particular key with the mobile phones of all drivers. In conventional PEPS systems, once key fob 120 is authenticated, vehicle 110 is allowed to start.

When the driver is in vehicle 110 with mobile phone 131 in close proximity, the vehicle operating system or other software platform is notified of the presence of mobile phone 131 in vehicle 110. Once the operating system of vehicle 110 registers the presence of mobile phone 131, the vehicle 110 operating system puts mobile phone 131 into Drive mode when the vehicle is shifted from Park into Drive.

Figure 2:
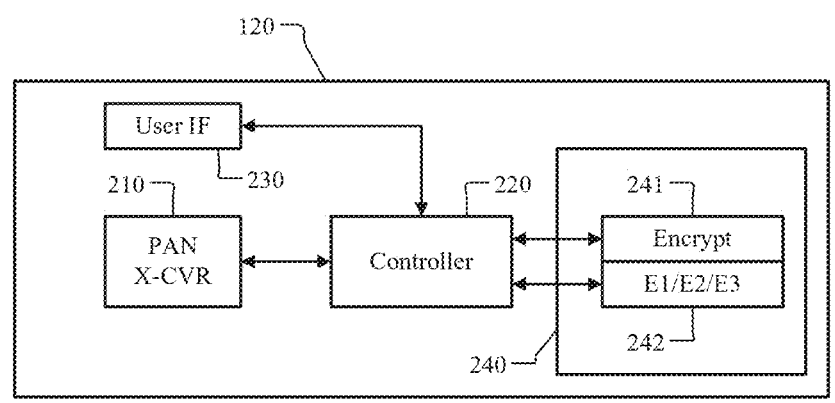
FIG. 2 illustrates an exemplary key fob according to one embodiment of the disclosure.

FIG. 2 illustrates exemplary key fob 120 according to one embodiment of the disclosure. Key fob 120 comprises personal area network (PAN) or Near Field Communication (NFC) transceiver (X-CVR) 210, controller 220, user interface (IF) 230, and memory 240, which stores, among other things, encryption application 241 and one or more logical entities 242 (i.e., E1, E2, E3). Memory 240 also stores the operating system software (not shown) that controller 220 executes in order to control the operation of key fob 210, including communications with mobile phones 131-133 and vehicle 110. For convenience, any short range transceiver described hereafter, such as PAN/NFC 210, may simply be referred to as a "PAN transceiver". It should be understood, however, that such a reference is intended to include not only PAN transceivers, but also NFC transceivers, and other equivalent transceivers.

In normal operation, the driver presses the buttons of user IF 230 in order to open the doors and/or trunk of vehicle 110 and to pair with mobile phones 131-133. Controller 220 does this by communicating via PAN transceiver 210 with a PAN/NFC transceiver in vehicle 110. Controller 220 executes the encryption application 241 in order to use the encryption key K1 of key fob 120 and the encryption keys P1, P3, and P3 of mobile phones 131-133 in order to generate the logical entities E1, E2, and E3. Controller 220 uses the logical entities to establish the secure communications links 141-143 over PAN/NFC transceiver 210, as noted above. Controller 220 also transmits the mobile device identification information (i.e., mobile phone number, K1, K2, K3) to vehicle 110 in order to facilitate pairing between the mobile devices 131-133 and vehicle 110. In alternate embodiments, driver interaction is not necessary. Conventional key fobs in some systems are interrogated by and respond to transponders in a vehicle. In such systems, the key fob may be modified to add the mobile ID to the signal that the key fob transmits to the transponder in the vehicle.

Figure 3:
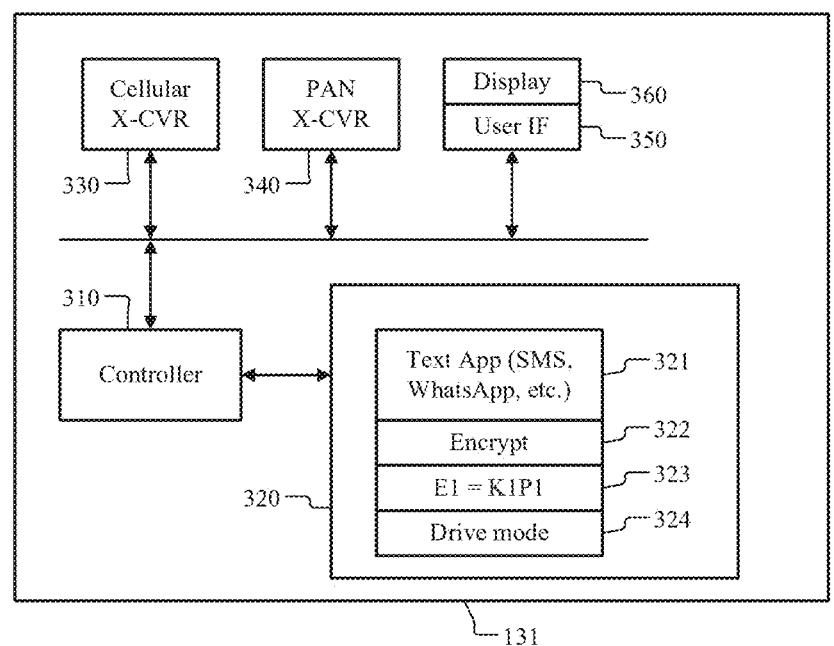
FIG. 3 illustrates an exemplary mobile phone according to one embodiment of the disclosure.

FIG. 3 illustrates exemplary mobile phone 131 according to one embodiment of the disclosure. Mobile phone 131 comprises controller 310, memory 320, cellular transceiver (X-CVR) 330, personal area network (PAN) transceiver (X-CVR) 340, user interface (IF) 350, and display 260. Among other things, memory 320 stores one or more texting applications (e.g., a short message service (SMS) application, a WhatsApp application, etc.), encryption application 322, and logical entity 323 (i.e., E1=K1P1), and Drive Mode application 324. Memory 320 also stores the operating system software (not shown) that controller 310 executes in order to control the operation of mobile phone 131, including communications with key fob 120, and vehicle 110.

In normal operation, the driver makes phone calls and operates apps on mobile phone 131 via user IF 350 (e.g., touch screen keyboard) and display 360. Controller 310 executes the operating system software in order to communicate with a cellular network (not shown) via cellular transceiver 330 and to communicate with nearby devices (e.g., key fob 120, vehicle 110) via PAN transceiver 340. Controller 310 also executes numerous applications stored in memory 320, including texting applications, such as SMS and/or WhatsApp. Controller 310 may also execute encryption application 322 in order to use the encryption key K1 of key fob 210 and the encryption key P1 of mobile phone 131 in order to generate the logical entity E1. Controller 310 uses the logical entity E1 to establish the secure communication link 141 over PAN transceiver 340. Finally, mobile phone 324 may execute Drive Mode application 324 which determines that mobile phone 324 is moving in vehicle 110 and prevents text messages from being displayed to the driver while sending responses to texting parties that the driver is unavailable to receive text messages, as explained below in greater detail.

Figure 4:
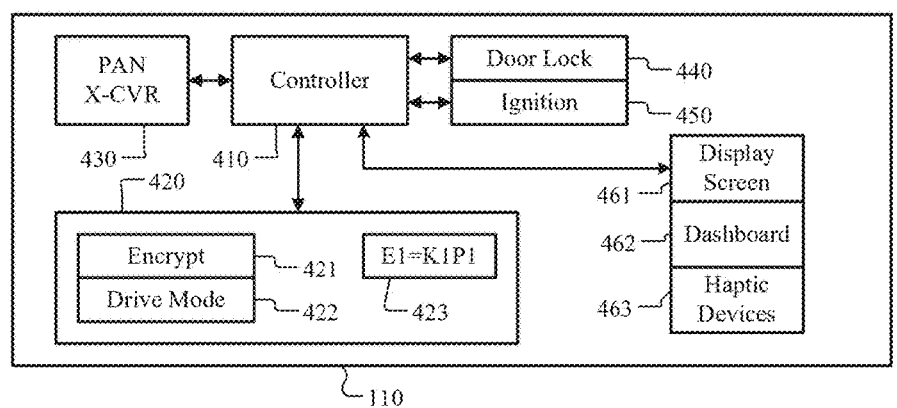
FIG. 4 illustrates an exemplary vehicle passive entry and passive start (PEPS) system according to one embodiment of the disclosure.

FIG. 4 illustrates exemplary control systems of vehicle 110, including the passive entry and passive start (PEPS) system, according to one embodiment of the disclosure. The control systems of vehicle 110 comprise controller 410, memory 420, personal area network (PAN) transceiver (X-CVR) 430, door lock system 440, ignition system 450, display 461, dashboard instruments 462, and haptic devices 463. Among other things, memory 420 stores, encryption application 421, Drive Mode application 422, and logical entity 423 (i.e., E1=K1P1).

In normal operation, controller 410 may communicate with both key fob 120 and vehicle 110 via PAN transceiver 430. In response to the driver pressing buttons on key fob 120, controller 410 may cause door lock system 440 to lock or unlock the doors of vehicle 110. In a PEPS system, the proximity of key fob 120 may cause controller 410 to automatically unlock the car doors without the driver pressing any buttons on key fob 120. Similarly, in response to the driver pressing an ignition button on the dash board, while the brake is applied, controller 410 may cause ignition system 450 to start or stop the engine of vehicle 110. Controller 410 may also execute encryption application 421 in order to use the encryption key K1 of key fob 120 and the encryption key P1 of mobile phone 131 in order to generate the logical entity E1 423. Alternatively, controller 410 may receive logical entity E1 from key fob 120. Controller 410 may use logical entity E1 to establish a secure communication link over PAN transceiver 430 with mobile phone 131. Additionally, controller 410 may store in memory 420 a mobile identification (ID) associated with mobile phone 131, such as a phone number of mobile phone 131.

Controller 410 is configured to display messages and information content associated with various applications on display screen 461. Display screen 461 is typically a touchscreen of an infotainment device in the center console of vehicle 110. Controller 410 is also configured to control the instruments and instrument displays/indicators on dashboard 461, such as speedometers, temperature sensors, fuel gauge, and the like. Finally, controller 410 is configured to operate haptic devices in the passenger compartment of vehicle 110, including vibrating devices in seats, steering wheels, and the like.

Figure 5:
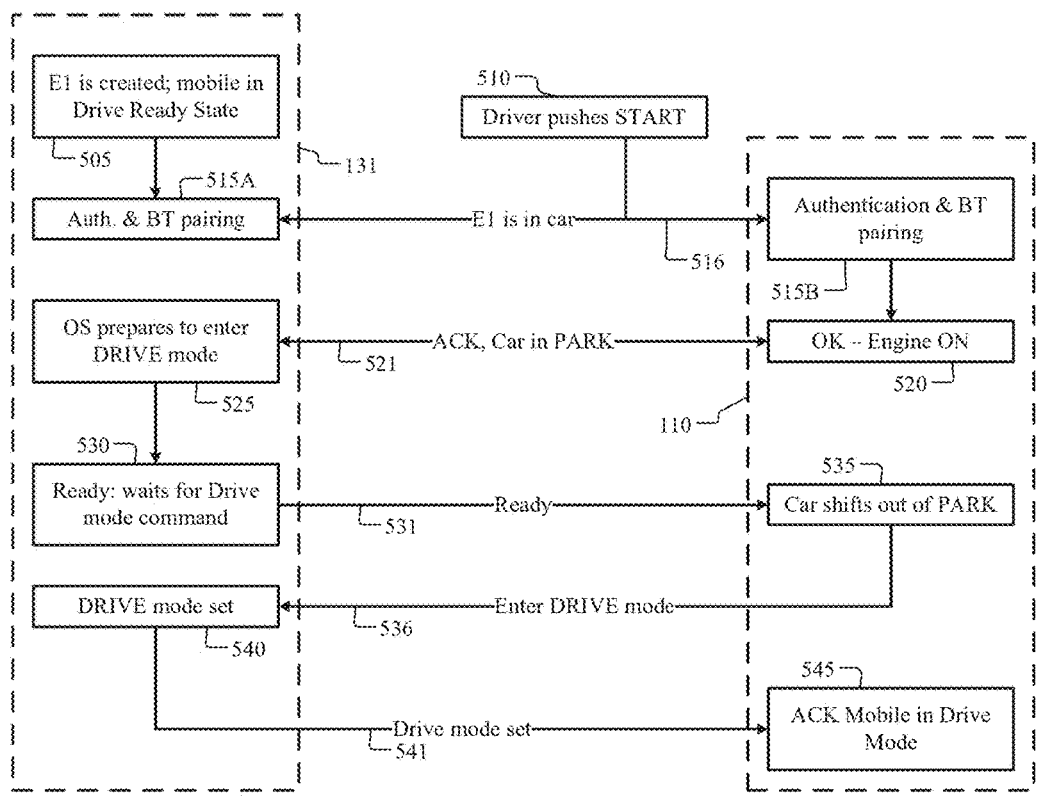
FIG. 5 is a flow diagram illustrating an operation in which a mobile device enters DRIVE mode according to one embodiment of the disclosure.

FIG. 5 is a flow diagram illustrating an operation in which a mobile device enters Drive Mode according to one embodiment of the disclosure. Initially, mobile phone 131 and key fob 120 pair and form logical entity E1=K1P1. Mobile phone 131 is now in the Drive Ready state and under the control of Drive Mode application 422 (step 505). In the Drive Ready state, mobile phone 131 continues to operate normally but PAN transceiver 340 enters into a duty cycle operation in which PAN 340 transceiver turns ON briefly and searches for a beacon signal from PAN transceiver 430 in vehicle 110 and the turns OFF if no beacon signal is detected. To save battery power the ON time (e.g., 10 milliseconds) is much shorter than the OFF time (e.g., 5 seconds). In an advantageous embodiment, the power level of PAN transceiver 340 is kept at a minimum level even in search mode, so that mobile phone 131 is either in or very near vehicle 110 before PAN transceiver 340 detects PAN transceiver 430 in vehicle 110. This will keep power consumption to a very low level compared to the normally high power level used by, for example, Bluetooth devices operating in search mode. According to an advantageous embodiment, Drive Mode application 324 may be part of the operating system software of mobile phone 131 or may be capable of reconfiguring the operating system such that PAN transceiver 340 is cycled ON and OFF (in the background) even though the driver may disable PAN transceiver 340 (e.g., BT Disabled) in the control settings of mobile phone 131. This allows mobile phone 131 to be placed into and taken out of Drive Mode by vehicle 110 without requiring the driver to turn Bluetooth ON and OFF when the driver enters and leave vehicle 110.

At some point after the pairing of mobile phone 131 and key fob 120, the driver pushes the START button of vehicle 110 (step 510). When vehicle 10 powers up, PAN transceiver 430 turns ON and authentication and BT pairing occurs between PAN transceiver 430 and PAN transceiver 340 (step 515A and 515B). The authentication and pairing enables vehicle 110 control software to determine that logical entity E1 is in vehicle 110 (step 516). This authentication process is performed by controller 410 and may include pairing with mobile phone 131 by PAN transceivers 340 and 430 using a conventional protocol, such as Bluetooth.

After Bluetooth pairing is completed, vehicle 110 enters a state in which the engine is ON and vehicle 110 is still in Park (step 520). Vehicle 110 sends an acknowledgement (ACK) message to mobile phone 131 indicating that vehicle 110 is in Park (step 521). Upon receipt of the ACK message in step 521, the mobile phone 131 operating system (OS), executed by controller 310, prepares to enter Drive mode (step 525). Mobile phone 131 then enters a Ready state in which mobile phone 131 waits for a command to enter Drive mode (step 530) and sends a "Ready" message to vehicle 110 (step 531).

At some point, the driver shifts vehicle 110 out of Park (step 535). In response, controller 410 sends a message to mobile phone 131 instructing mobile phone 131 to enter Drive Mode (step 536). Mobile phone 131 then enters Drive Mode (step 540) and sends a message to vehicle 110 indicating that Drive Mode is set in mobile phone 131 (step 541). At this point, controller 410 acknowledges that mobile phone 131 is in Drive Mode and is prepared to display and process text messages received from mobile phone 131, as described herein.

Thereafter, mobile phone 131 blocks and disregards any text message from any application or service (i.e., SMS, WhatsApp) unless the text sender is in the Contacts list in mobile phone 131. Mobile phone 131 may also respond to a text message by sending a message to the sender informing the sender that the driver is operating vehicle 110 and is unavailable to text. Further, once Drive Mode is set, vehicle 110 may allow only audio messages and voice calls to be played through the speakers of vehicle 110.

Figure 6:
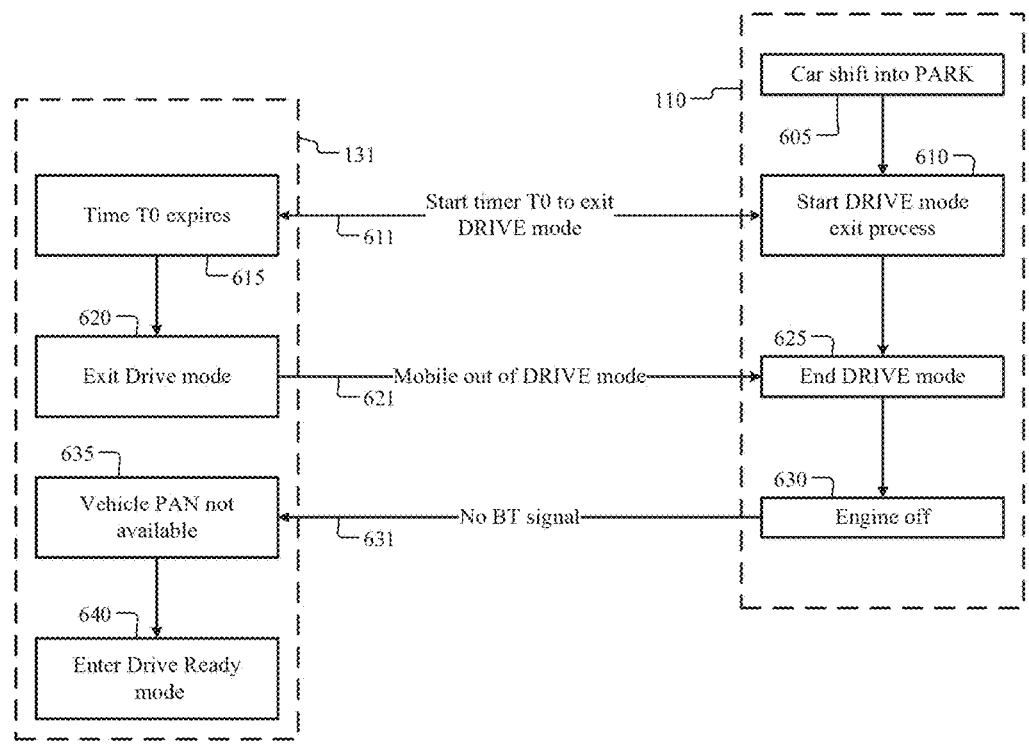
FIG. 6 is a flow diagram illustrating an operation in which a mobile device exits DRIVE mode according to one embodiment of the disclosure.

FIG. 6 is a flow diagram illustrating an operation in which a mobile device exits Drive Mode according to one embodiment of the disclosure. At some point, the driver shifts vehicle 110 into Park (step 605). Vehicle 110 then starts a Drive Mode Exit process (step 610) and sends a message to mobile phone 131 to start a timer T0 to exit Drive Mode (step 611). The timer T0 provides a delay time in case the driver does not shut off vehicle 110. Putting vehicle 110 in Park stops Drive Mode, but does not necessarily stop the full Bluetooth connection with mobile phone 131. At some point, timer T0 expires (step 615) and mobile phone 620 exits Drive Mode (step 620). Next, mobile phone 131 transmits a message to vehicle 110 to indicate that mobile phone 131 has exited Drive Mode and is receiving texts messages again (step 621).

At that point, vehicle 110 ends Drive Mode (step 625) in which vehicle 110 does not expect to receive text messages from mobile phone 131. At this point, mobile phone 131 is in a normal operating mode in which the driver is able to reply to text messages, but PAN transceiver 340 resumes duty cycling. The driver may leave vehicle 110 running while in Park or may finally turn the engine OFF (step 630).

When the engine is shut OFF, no further BT signals are sent by vehicle 110 (step 631). In response, controller 310 in mobile phone 131 determines that PAN transceiver 430 in vehicle 110 is no longer available (step 635). Mobile phone 131 may then enter Drive Ready state (step 640) in which the Bluetooth connection to vehicle 110 is ended, but controller 310 continues to monitor PAN transceiver 430 in a cyclical manner in case the driver restarts vehicle 110 and puts vehicle 110 in Drive again. This Drive Ready state is the same as in Step 505 in FIG. 5.

As noted, Drive Mode application 324 may be implemented via a downloadable application, but may also be a part of the operating system of mobile phone 131. When vehicle 110 directs mobile phone 131 to enter Drive Mode, mobile phone 131 allows the pairing without any driver interaction. This provides risk free functionality to be implemented without any driver interaction except when the driver first pairs key fob 120 with mobile phone 131.

In Drive mode, mobile phone 131 is paired with PAN transceiver 430 of vehicle 110. In this mode, mobile phone 131 only notifies the driver of voice calls and audio messages from person in the Contacts list. Voice calls can be established through the speaker system of vehicle 110. All other text, e-mail, or other data communications that are not from a party in the Contacts list shall not be notified to the diver until vehicle 110 is in Park. Although mobile phone 131 may still receive these text type messages, the driver is not notified. If vehicle 110 is in Park, by way of example, for more than one minute, the driver may be notified of the messages. The delay time may be decided by the vehicle manufacturer.

When mobile phone 131 receives a text message or a message that is text, but not SMS, (WhatsApp, Viber, etc.), the following may occur. In the case of an SMS message (from a Contact list party), mobile phone 131 receives the SMS text message and sends back an SMS text message reply notifying the sender that the recipient (i.e., driver) is driving and to call mobile phone 131 if the sender must get in touch with the driver. In the case of a WhatsApp or similar message, mobile phone 131 sends a message to the sender through the same app in which the message was received and notifies the sender to call or send an audio message. WhatsApp and similar applications have the capability to record and to send audio messages.

By way of example, in case of WhatsApp, the texting or sending party may call. In this case, the vehicle 110 speaker system will handle the call. If the sender sends an audio message, the Drive Mode of mobile phone 131 detects the audio message and notifies the driver of the audio message. As an example, the audio message may be announced via the speaker system. The driver then pushes the PHONE button on his steering wheel for five (5) seconds. Vehicle controller 410 detects the phone button being depressed for more than 5 seconds and plays the audio message. This would make the communication safer than changing radio stations on the dash since the PHONE button is on the steering wheel.

If there are multiple users/drivers in vehicle 110 that are associated with key fob 120 (i.e., E1, E2 and E3), this may be dealt with in a number of ways. In a first scenario, all three mobile phones 131-133 may be put into Drive Mode and all are given an option via controller 410 to opt out. Controller 410 may sends a message to each user, such as "You are in Drive Mode. Would you like to opt out"? If two opt out, then the third is treated as the driver. But controller 410 may be designed so that all three cannot opt out if this is a mandatory system.

In a second scenario, if all three logical entities are in vehicle 110, then vehicle 110 user interface (e.g., display screen 461) may present the three mobile phone numbers on the dashboard display and ask "Who is driving"? The driver presses the soft button next to his or her phone number and controller 410 puts that mobile into Drive Mode and the other two mobile phones are released.

The information exchange between key fob 120 and mobile phone 131 identifies vehicle 110 to mobile phone 131 and mobile phone 131 to vehicle 110 when key fob 120 and mobile phone 131 are first paired (i.e., formation of the logical entity E1=K1P1). Once logical entity E1 is generated, mobile phone 131 begins searching for vehicle 110 BT signal periodically (e.g., once every 5 seconds). In effect, this means that the BT transceiver would be turned ON for a duration of only milliseconds, which would have negligible battery impact. This searching state would be active whether or not the user is in vehicle 110.

In some countries, many SMS messages are just a phishing scheme or a marketing campaign. In such cases, if mobile phone 131 is in Drive Mode, controller 310 may only respond to messages and texts that are received from phone numbers that are in Contact list (in memory 320) of mobile phone 131. All other message are treated the same as e-mail messages, so that the driver is not informed until Drive Mode ends when vehicle 110 shifts into Park. Also, no notification message is sent back to the sender of the marketing messages.

In order to eliminate spam texting, the mobile phone 131 user may be given the option to display text notification on a convenient spot on display screen 461—for all texts or just for texts from parties in the contact list. If a text is not from a contact registered in mobile phone 131, vehicle 110 may not show "there is a text" indication until mobile is out of Drive Mode. If a text is from a contact, then vehicle 110 indicates to the driver that there is a text and displays to the driver the contact name the text came from somewhere on display screen 461. The content of the text is not shown. Ideally, display screen 461 provides a dial out button (e.g., a phone icon), so the driver may call the person by pressing the button.

If there is an audio message, the display screen may show that there is an audio message and pushing the phone icon may allow the driver to play the audio message. Once the audio message is played, flashing the same phone icon may provide a method for the driver to record his audio message response. When the phone icon is pressed again for several seconds, the message may be transmitted via the same messaging application that received the audio message from the caller.

In the examples above, it is assumed that the driver uses a mobile phone. This is by way of example only however and should not be construed to limit the scope of the present disclosure. More generally, mobile phones 131-133 may be any type of wireless terminal that the driver/user possesses, including laptops and tablets.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A wireless terminal having a user interface comprising:
a cellular transceiver configured to communicate with a cellular network and to receive therefrom an incoming text message from a calling party;
a personal area network (PAN) transceiver configured to communicate with a vehicle PAN transceiver associated with a vehicle; and
a controller configured to receive a message from the vehicle PAN transceiver indicating that the vehicle has been shifted out of PARK and, in response, to place the wireless terminal in a drive mode, wherein, during drive mode, the controller detects receipt of the incoming text message by the cellular transceiver and is further configured to prevent the text message from being displayed to the driver on the user interface of the wireless terminal, and wherein the controller is further configured to determine if the calling party that sent the incoming text message is listed in a Contacts list associated with the wireless terminal, in response to a determination that the calling party is listed in the Contacts list, to at least one of:
notify the driver that a text message has been received from the calling party; or
display a message on a user interface of the vehicle that a text message has been received from the calling party.

2. The wireless terminal as set forth in claim 1, wherein the controller is further configured to transmit a response message to the calling party, the response message stating that the driver is unable to receive text messages.

3. The wireless terminal as set forth in claim 1, wherein the incoming text message is a short messaging service (SMS) text.

4. The wireless terminal as set forth in claim 1, wherein the incoming text message is processed by a message application in a memory of the wireless terminal.

5. A system in a vehicle for communicating with a wireless terminal associated with a driver, the system comprising:
a vehicle personal area network (PAN) transceiver configured to communicate with a PAN transceiver associated with the wireless terminal;
a vehicle user interface configured to display messages and to receive manual inputs from a driver of the vehicle; and
a controller configured to detect the presence of the wireless terminal in the vehicle and to transmit a control message to the wireless terminal operable to place the wireless terminal in a drive mode which prevents the wireless terminal from notifying the driver on a user interface of the wireless terminal that a text message has been received, wherein the control message is transmitted to the wireless terminal in response to the vehicle being shifted out of PARK and in response to a determination that the calling party is listed in a Contacts list associated with the wireless terminal, wherein the controller is further configured to at least one of:
notify the driver that a text message has been received from the calling party; or
display a message on a user interface of the vehicle that a text message has been received from the calling party.

6. The system as set forth in claim 5, wherein the controller detects the presence of the wireless terminal when the vehicle PAN transceiver pairs with the PAN transceiver of the wireless terminal.

7. The system as set forth in claim 5, wherein the controller is further configured to receive from the wireless terminal a message identifying a called party that sent the text message.

8. A wireless terminal comprising:
a user interface comprising a display and a user input device;
a cellular transceiver configured to communicate with a cellular network;
an internal personal area network (PAN) transceiver configured to communicate with an external PAN transceiver; and
a controller configured to determine when an operator of the wireless terminal has entered an input command operable to disable the internal PAN transceiver and, in response, to cause the internal PAN transceiver to cycle ON and OFF and to search for the external PAN transceiver when the internal PAN transceiver is ON.

9. The wireless terminal as set forth in claim 8, wherein the controller is further configured to enable the internal PAN transceiver for full operation when the internal PAN transceiver detects the external PAN transceiver.

10. The wireless terminal as set forth in claim 8, wherein the controller causes the internal PAN transceiver to cycle ON and OFF with a low duty cycle.

11. The wireless terminal as set forth in claim 8, wherein the controller causes the internal PAN transceiver to turn on for a duration not exceeding 10 milliseconds once every 5 seconds.

* * * * *